United States Patent [19]
Jarrand

[11] Patent Number: 5,595,549
[45] Date of Patent: Jan. 21, 1997

[54] HYDRAULIC TENSIONER WITH LUBRICATOR FOR IC ENGINE TRANSMISSION CHAIN

[75] Inventor: Patrick Jarrand, Seyssins, France

[73] Assignee: Sachs Industries S.A. (Huret et Maillard Reunis), Chepy, France

[21] Appl. No.: 364,453

[22] Filed: Dec. 27, 1994

[30] Foreign Application Priority Data

Jan. 17, 1994 [FR] France ................................ 94 00438

[51] Int. Cl.$^6$ ................................................ F16H 57/04
[52] U.S. Cl. ........................... 474/91; 474/110; 474/138
[58] Field of Search ............................ 474/91, 110, 135, 474/138

[56] References Cited

U.S. PATENT DOCUMENTS 4,283,181  8/1981  Sproul ..................................... 474/110
4,940,447  7/1990  Kawashima et al. .................... 474/110
5,073,150  12/1991  Shimaya ................................ 474/110
5,090,946  2/1992  Futami et al. ...................... 474/110 X

FOREIGN PATENT DOCUMENTS 0280600  8/1988  European Pat. Off. .
0318151  5/1989  European Pat. Off. .
2516620  5/1983  France .
2645931  10/1990  France .

Primary Examiner—Roger J. Schoeppel
Attorney, Agent, or Firm—Young & Thompson

[57] ABSTRACT

The tensioner includes a body (12) defining a blind cylindrical cavity (14) and a piston (20) slidably mounted in the cavity (14) and adapted to bias a pressure shoe (24) into contact with the endless connection element (26) so as to put the latter under tension. The inner end (18) of the cavity defines an orifice (28) for connection to a source of liquid under pressure and closable by a resilient blade (36) constituting a check valve.

9 Claims, 2 Drawing Sheets

HYDRAULIC TENSIONER WITH LUBRICATOR FOR IC ENGINE TRANSMISSION CHAIN

The present invention relates to a hydraulic tensioner for an endless connection element, in particular for a transmission chain of an internal combustion engine.

Hydraulic tensioners for a chain or other endless connection element are known in the art, such as for example those disclosed in French patent FR-2 610 685.

Such tensioners comprise a body defining a cylindrical cavity, a piston slidably mounted in said cavity and a pressure shoe bearing against the endless connection element. A high pressure chamber is defined by a part of the cavity and the piston. The chamber is fluidtight and connected to a source of hydraulic fluid under pressure through a check valve comprising a ball biased to the closing position by a spring.

When the endless connection element becomes slack, the pressure exerted by the piston on the liquid contained in the fluidtight chamber is decreased and the valve, under the effect of the pressure exerted by the fluid coming from the source, opens so as to increase the pressure in the chamber. This increase in pressure increases the volume of the chamber which results in a displacement of the piston in a direction in which it puts the endless connection element under tension until a new state of balance is reached ensuring a predetermined tension of the endless connection element.

In the event of the endless connection element exerting an excess pressure on the shoe, the piston theoretically cannot slide in a direction reducing the volume of the chamber because the latter is fluidtight and filled with incompressible liquid which limits the backlash of the endless connection element.

However, in practice, the liquid under pressure is usually formed by a mineral oil in which a little air is mixed. Consequently, a certain amount of air is introduced with the oil under pressure into the fluidtight chamber, so that the piston can in fact reciprocate owing to the compressibility of the air, with the danger that, when there is a large amount of air, the effectiveness of the tensioner for limiting the backlash of the endless connection element is reduced.

Further, the valve is opened when the pressure difference on each side of the valve exceeds a threshold determined by the stiffness of the spring of the valve, which limits the flexibility of the adaptation of the tensioner to variations in the tension of the endless connection element due in particular to the backlash of the latter.

An object of the invention is to overcome these drawbacks and to provide a hydraulic tensioner comprising in particular simple, reliable and inexpensive means for absorbing the backlash of the endless connection element in a flexible manner.

The invention therefore provides a hydraulic tensioner for an endless connection element, in particular for a transmission chain of an internal combustion engine, comprising a body defining a blind cylindrical cavity and a piston slidably mounted in the cavity and adapted to bias a pressure shoe into contact with the endless connection element so as to put said endless connection element under tension, characterized in that the end of the cavity comprises an orifice for connection to a source of liquid under pressure and closable by a resilient blade forming a check valve.

According to other features of the invention:

the resilient blade is defined by a cutting line having an open contour provided in a disc held against the inner end of the cavity by a helical compression spring arranged in the cavity between the piston and the disc;

the compression spring has a first end portion which is disposed in an axial blind bore in the piston and provided with coils of constant diameter, and a second end portion in contact with the peripheral edge of the disc and the lateral surface of the cavity and provided with coils whose diameters increase in a direction away from said first end portion, the tensioner further comprising means for ensuring a minimum axial spacing between the inner end of the piston in the body and the second end portion of the spring of larger diameter;

the means for ensuring a minimum axial spacing comprise a shoulder for limiting the inward travel of the piston provided in the lateral wall of the cavity, spaced axially from the inner end of the cavity and adapted to cooperate with the inner end of the piston;

the piston is guided in the cavity with a radial clearance forming a calibrated passage for liquid under pressure which damps the reciprocations of the piston in the cavity;

the piston comprises on its outer surface at least one flat face adapted to cooperate with a complementary stop which is fixed to the body and projects into the cavity for preventing the piston from rotating about its axis;

the flat face extends axially from the end of the piston outside the body to a shoulder disposed qn the piston perpendicular to its axis and adapted to cooperate with the projecting stop in the cavity for limiting the outward travel of the piston;

the piston has a stepped cylindrical outer surface defining a shoulder adapted to cooperate with at least one complementary stop fixed to the body and projecting into the cavity for limiting the outward travel of the piston;

the projecting stop of the cavity is defined by a cylindrical pin fixed in the body in a position perpendicular to the axis of the piston;

the projecting stop of the cavity is defined by a projection which is in one piece with the body;

the outer end of the piston outside the body is provided with a calibrated orifice communicating with the cavity and permitting, on one hand, the spraying of liquid under pressure onto the endless connection element so as to lubricate the latter and, on the other hand, the damping of the reciprocations of the piston in the cavity.

A better understanding of the invention will be had from the following detailed description given solely by way of example with reference to the accompanying drawings, in which.

Figure 1:
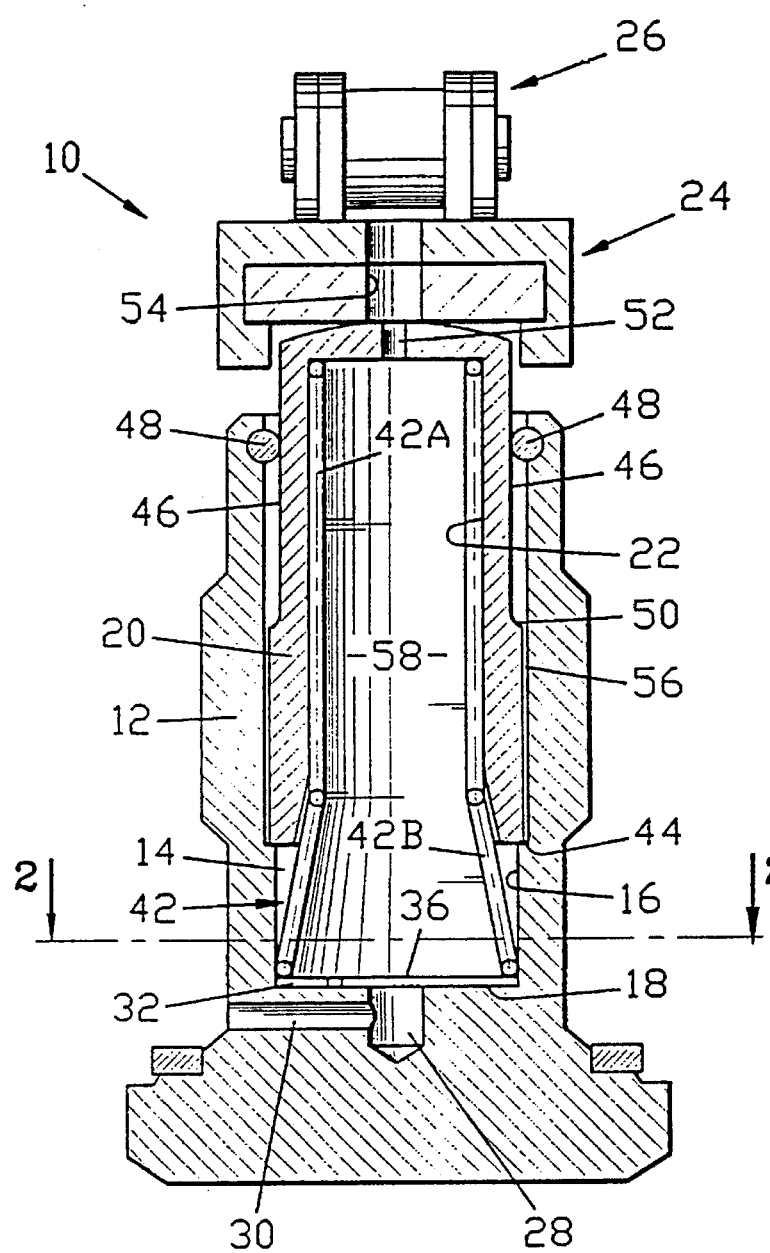
FIG. 1 is an axial sectional view of a tensioner according to the invention.

Shown in FIG. 1 is a hydraulic tensioner for an endless connection element according to the invention, designated by the general reference numeral 10.

The tensioner 10 comprises a body 12 of generally cylindrical shape in which is provided a blind axial cavity 14 defined by a cylindrical lateral wall 16 and an inner end 18.

A piston 20 of generally cylindrical shape complementary to that of the cavity 14 is axially slidably mounted in the latter 14. The piston 20 is provided with a blind axial bore 22 which is open at the end of the piston inside the cavity.

The outer end of the piston 20 outside the cavity biases a pressure shoe 24 of known type into contact with the endless connection element for putting the latter under tension.

In the embodiment illustrated in FIG. 1, the endless connection element is constituted by a transmission chain 26 for an internal combustion engine of known type. The tensioner 10 and the shoe 24 are mounted on a part of the crankcase in the known manner which will not be described in more detail.

The inner end 18 of the cavity defines an axial orifice 28 adapted to be connected to a source of liquid under pressure, such as mineral oil, in particular through a radial duct 30 provided in the body 12. The source of liquid under pressure is constituted for example by an oil pump of the engine (not shown).

The tensioner 10 further comprises a metal disc 32 having a contour complementary to that of the cavity 14 and bearing by one of its faces against the inner end 18 of the cavity.

Figure 2:
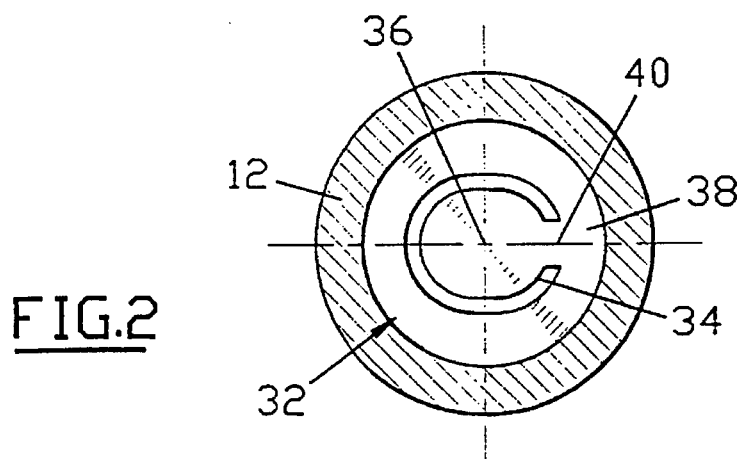
FIG. 2 is a sectional view taken on line 2—2 of FIG. 1.

With reference to FIG. 2, it can be seen that the disc 32 includes a cutting line 34 of open contour defining a central part of the disc constituting a resilient blade 36 connected to the peripheral portion 38 of the disc by a connecting part 40.

The resilient blade 36 constitutes a check valve which allows the passage of liquid between the orifice 28 and the cavity 14 but prevents the passage of liquid in the opposite direction.

The disc 32 is maintained against the inner end 18 of the cavity by a compression helical spring 42 arranged in the cavity 14 between the piston 20 and the disc 32.

The spring 42 comprises a first end portion 42A disposed in the bore 22 of the piston and provided with coils of constant diameter, and a second end portion 42B having a generally conical shape and provided with coils whose diameters increase in the direction away from the first end portion 42A.

The conical end portion 42B of the spring enables the latter to bear against the peripheral edge portion 38A of the disc and the lateral surface 16 of the cavity which are radially set back from the lateral surface of the bore 22.

The tensioner 10 further comprises means for ensuring a minimum axial spacing between the inner end of the piston 20 and the conical end portion 42B of the spring so as to avoid in particular the crushing of said end portion by the piston when the latter is urged into the cavity 14.

These spacing means comprise a shoulder 44 limiting the inward travel of the piston 20 provided in the lateral wall 16 of the cavity 14 at an axial distance from the inner end 18 of the cavity and adapted to cooperate with the inner end of the piston 20, as shown in FIG. 1.

In an alternative embodiment, the dimensions of the peripheral edge portion 38 of the disc, of the cavity 14 and of the bore 22 may be so adapted as to permit replacing the spring 42 having a conical end portion by a spring provided with coils of constant diameter throughout its length.

The piston 20 comprises on its outer surface two diametrically opposed flat faces 46 adapted to cooperate respectively with two cylindrical pins 48 fixed in the body in a position perpendicular to the axis of the piston so as to prevent the latter from rotating about its axis.

Each flat face 46 extends from the outer end of the piston 20 to a shoulder 50 provided on the piston in a position perpendicular to the axis of the piston and constituting a stop limiting the outward travel of the piston.

In an alternative embodiment, the tensioner 10 may comprise a single flat face for preventing the piston from rotating.

It will be understood that other embodiments of stop means for limiting the outward travel of the piston may be envisaged without departing from the scope of the invention.

Figure 3:
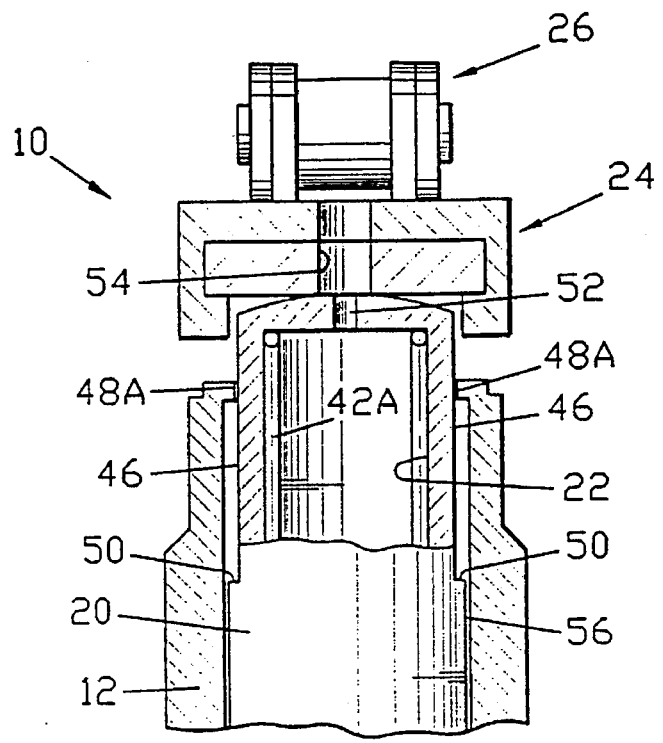
FIGS. 3 and 4 are partial views similar to FIG. 1 of alternative embodiments of the stop means for limiting the outward travel of the piston.

In particular, the pins 48 may be replaced by stops 48A which project into the cavity 14, are in one piece with the body 12 and are for example formed by a forming over of the outer end edge portion of the body 12 (see FIG. 3).

Figure 4:
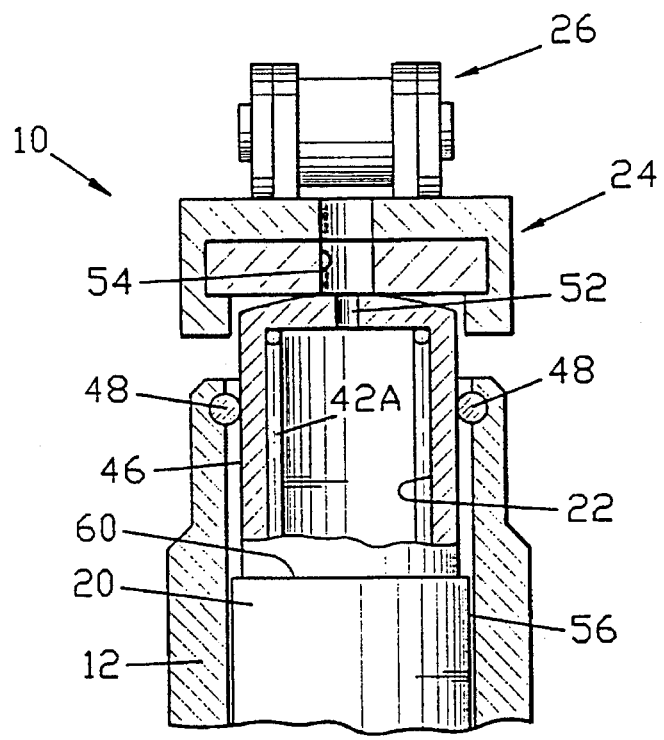

In some applications of the tensioner according to the invention it is unnecessary to prevent the piston 20 from rotating. In this case, the outer surface of the piston 20 is advantageously defined by a stepped cylindrical surface defining a shoulder 60, the outside diameter of the outer end portion of the piston 20 being smaller than that of the remainder of the piston (see FIG. 4). The shoulder 60 thus forms a stop for limiting the outward travel of the piston 20 and is adapted to cooperate with the pins 48 shown in FIG. 4, or, in an alternative embodiment, with the stops 48A shown in FIG. 3.

The outer end of the piston 20 is provided with a calibrated aperture 52 communicating with the cavity 14 and permitting the spraying onto the chain 26, through a passage 54 provided in the shoe 24, of the liquid under pressure for lubricating this chain.

The calibrated aperture 52 also permits damping the reciprocations of the piston 20 in the cavity 14 by the effect of the flow of liquid through this aperture, and thus preventing the backlash of the chain 26.

For the same purpose of damping the reciprocations of the piston 20, the latter is guided in the cavity 14 with a radial clearance 56 forming a calibrated annular passage for liquid under pressure.

What is claimed is:

1. Hydraulic tensioner for an endless connection element, in particular for a transmission chain of an internal combustion engine, said tensioner comprising in combination: a body defining a cylindrical cavity having a blind inner end, a piston slidably mounted in said cavity, and a pressure shoe associated with said piston so as to be biased by said piston into contact with said endless connection element and thereby put said endless connection element under tension, said blind inner end of said cavity defining an orifice for connection of said cavity to a source of liquid under pressure, and a resilient blade constituting a check valve associated with said orifice whereby said orifice is closable, said resilient blade being part of a disc and is defined by a cutting line having an open contour formed in said disc, said disc being placed against said blind inner end of said cavity, and a compression helical spring provided in said cavity between said piston and said disc for holding said disc against said blind inner end of said cavity, there being an axial blind bore in said piston, said compression spring having a first end portion which is disposed in said axial blind bore and includes spring coils of constant diameter, and a second end portion in contact with a peripheral edge portion of said disc and a lateral surface of said cavity and including spring coils having diameters which increases in a direction away from said first end portion, and means for ensuring a minimum axial spacing between an inner end of said piston in said body and said second end portion of said spring of larger diameter.

2. Hydraulic tensioner according to claim 1, comprising at least one stop fixed to said body and projecting into said cavity, and a stepped cylindrical outer surface on said piston defining a shoulder for cooperation with said at least one stop fixed to said body.

3. Hydraulic tensioner according to claim 1, comprising a calibrated aperture provided in an outer end of said piston outside said body and means putting said aperture in communication with said cavity for permitting a spraying of liquid under pressure onto said endless connection element thereby lubricating said endless connection element, and a damping of reciprocations of said piston in said cavity.

4. Hydraulic tensioner according to claim 1, wherein said means ensuring said minimum axial spacing comprise a shoulder cooperative with said piston for limiting the inward travel of said piston, said shoulder being provided in said lateral surface of said cavity, spaced axially from said blind inner end of said cavity and cooperative with said inner end of said piston.

5. Hydraulic tensioner according to claim 1, wherein said piston is guided in said cavity with a radial clearance constituting a calibrated passage for liquid under pressure for the purpose of damping reciprocations of said piston in said cavity.

6. Hydraulic tensioner according to claim 1, comprising a stop fixed to said body and inwardly projecting into said cavity, and at least one flat face provided on an outer surface of said piston for cooperation with said stop for immobilizing said piston against rotation about the axis of said piston.

7. Hydraulic tensioner according to claim 6, wherein said flat face extends axially from an end of said piston outside said body to a shoulder disposed on said piston perpendicular to the axis of said piston and cooperative with said stop for limiting an outward travel of said piston.

8. Hydraulic tensioner according to claim 6, wherein said stop projecting into said cavity is defined by a projecting portion of said body.

9. Hydraulic tensioner according to claim 6, wherein said stop projecting into said cavity is defined by a cylindrical pin fixed in said body and extending in a direction perpendicular to the axis of said piston.

* * * * *